W. BECKWITH.
Improvement in Stump Extractor.
No. 123,609. Patented Feb. 13, 1872.

UNITED STATES PATENT OFFICE.

WARREN BECKWITH, OF GENEVA, WISCONSIN.

IMPROVEMENT IN STUMP-EXTRACTORS.

Specification forming part of Letters Patent No. 123,609, dated February 13, 1872.

Specification describing a new and Improved Stump-Extractor, invented by WARREN BECKWITH, of Geneva, in the county of Walworth and State of Wisconsin.

The object of this invention is to furnish a machine for pulling stumps and raising rocks and other heavy bodies from the ground; and it consists in the construction, arrangement, and combination of parts hereinafter described.

Figure 1:
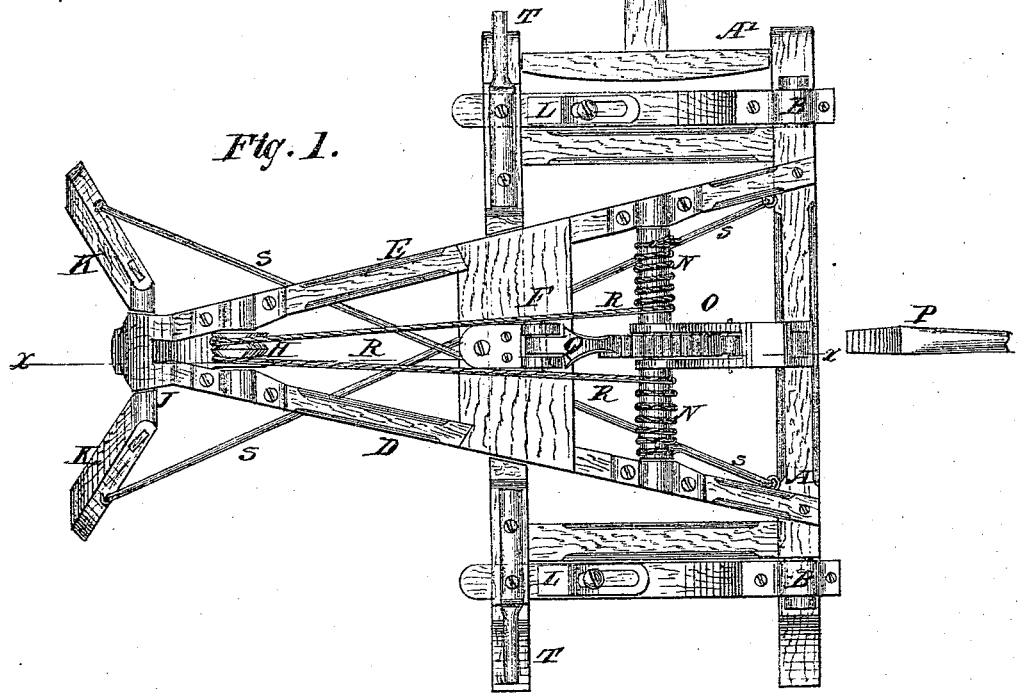
Figure 2:
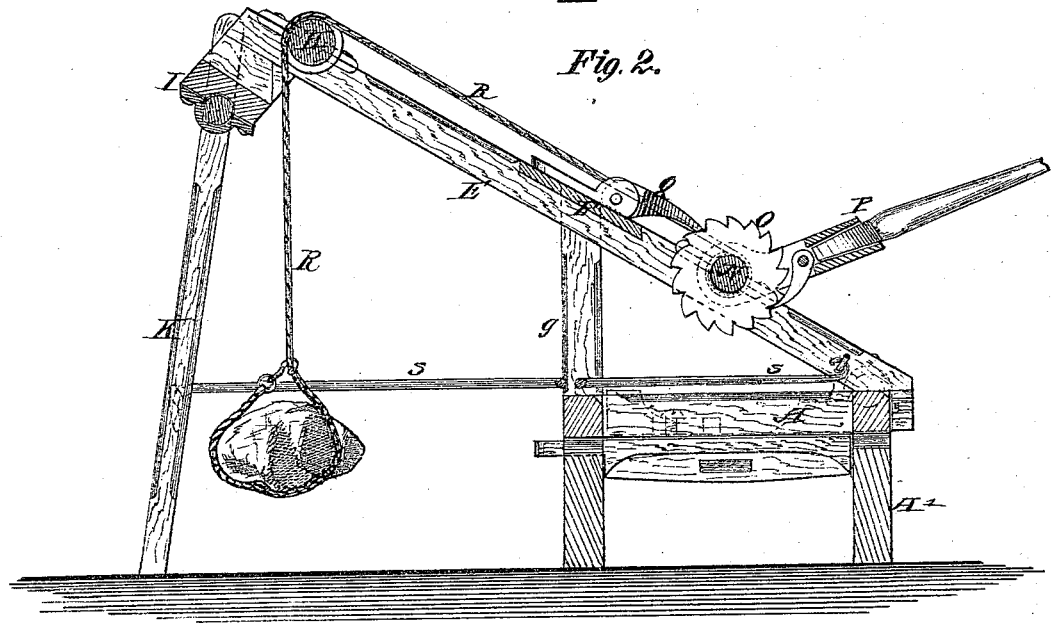

In the accompanying drawing, Figure 1 represents a top or plan view. Fig. 2 is a vertical section of Fig. 1 taken on the line $x\,x$.

Similar letters of reference indicate corresponding parts.

A represents a frame, which, for convenience in moving from place to place, is attached to a sled, A'. One side of the frame is hinged to the beams of the sled, as seen at B B, so that the machine may be raised up to balance on the sled and elevate the standards from the ground. A truck instead of a sled may be used. The upper portion of the machine consists of two inclined timbers, D and E, the lower ends of which are spread apart and attached to the frame A, as seen in the drawing. These two timbers are confined together by the cross-piece F, and supported from the frame by the posts $g\,g$. H is the pulley, on a rod which passes through the timbers D E. The upper ends of these timbers are confined together by the block I, which supports in a box a cross-shaft, J, to the ends of which shaft are attached the stands K K. The lower ends of these stands rest upon the ground in hoisting. The shaft J turns in its box, so that the stands K K can be moved toward or from the sled, as may be desired. L L are blocks on the beams of the sled, which are slotted so that they will slide forward under the frame when the machine is raised. This is done when the machine is moved, as the machine may be thereby balanced or nearly balanced for moving, and it may also be done for properly adjusting the machine to a stump, rock, or other article. N is the windlass, which is supported in boxes on the timbers D E, upon which windlass there is a ratchet-wheel, O. P is the pawl-lever, by means of which the windlass is revolved. Q is a holding-pawl, pivoted to the cross-piece F. R R are the hoisting-chains or ropes, attached to the windlass and passing up over the pulley H, from which they hang, with hooks upon their pendent ends.

In raising a stump, rock, or other article, the machine is so adjusted that the article to be raised is exactly under the pulley H.

S S are supporting-rods for holding the stands K K in position. They are attached to the timbers D E or to the frame A, and may be constructed and arranged in any manner. T T are handles for raising the machine.

Having thus described my invention, I claim as new and desire to secure by Letters Patent—

1. The frame A, timbers D E, standards K, windlass N, pulley H, and hoisting-chains or ropes R R, arranged substantially as and for the purposes described.

2. The standard-shaft J and block I, in combination with the standards K K, as seen, and for the purposes described.

WARREN BECKWITH.

Witnesses:
   J. H. MORSE,
   P. H. MOORE.